July 11, 1950
G. J. HERIGSTAD
2,514,764
AUTOMATIC CONTROL FOR COMBINE TABLE ELEVATORS
Filed Oct. 1, 1948
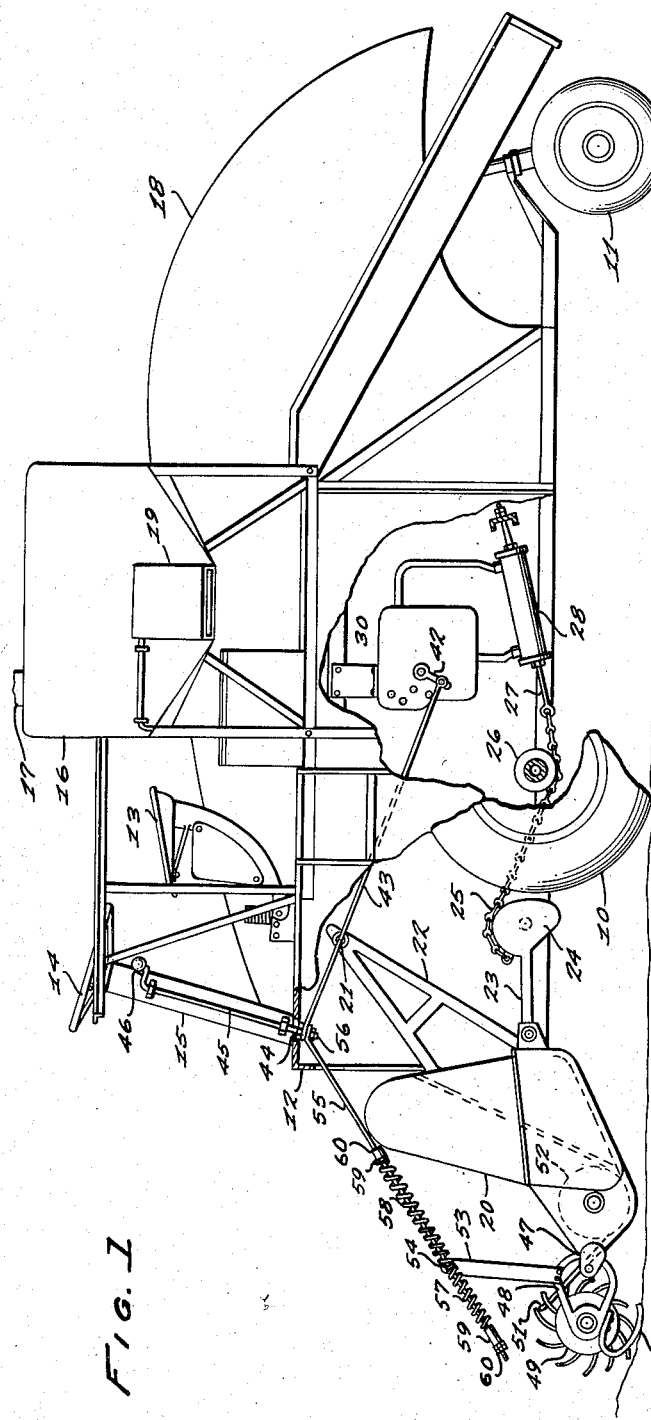
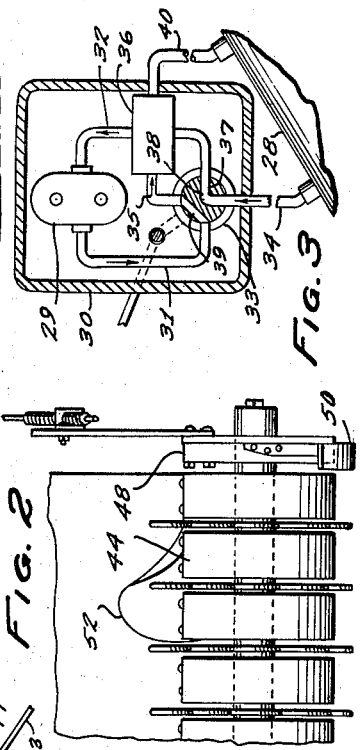
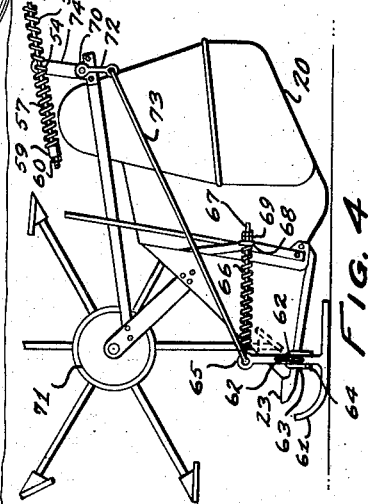
INVENTOR.
GUST J. HERIGSTAD
BY
McMorrow, Berman & Davidson
ATTORNEYS Patented July 11, 1950

2,514,764

UNITED STATES PATENT OFFICE 2,514,764

AUTOMATIC CONTROL FOR COMBINE TABLE ELEVATORS

Gust J. Herigstad, Mohall, N. Dak.

Application October 1, 1948, Serial No. 52,296

4 Claims. (Cl. 56—208)

This invention relates to combine table elevating mechanism, and more particularly to an improved automatic control for such mechanism to automatically maintain the leading or cutter bar edge of the table a predetermined distance above the ground and prevent such edge from digging into the ground when a sharp rise in the ground is encountered and from rising too high above the ground when the ground level declines.

Modern conventional combines are provided with tiltable grain-receiving tables and the larger sizes of such combines have power-operated mechanism, either hydraulic or electric, for raising the leading or cutter bar edge of the table. Such power-operated mechanisms are provided with manual controls so that the operator can raise and lower the cutter bar edge of the table as may be necessary to prevent such edge of the table from digging into or raising too high above the ground. Such operation necessitates constant alertness on the part of the operator and distracts his attention from other operational phases of the combine.

It is among the objects of the present invention to provide an improved automatic control for the table lift mechanism, which automatic control is supplementary to the existing manual control and does not in any way diminish manual control of the lift mechanism, is fully effective to maintain the cutting bar edge of the combine table a safe distance above the ground, can be applied to a conventional combine without material modification of the combine structure, is applicable to the combine whether provided with a cutter blade for a simultaneous cutting and threshing operation, or whether equipped with windrow pickup apparatus, which is easily adjustable to accurately control the lifting of the grain table or platform of the combine, and which is simple and durable in construction, economical to manufacture and easy to install.

Other objects and advantages will become apparent from a consideration of the following description and the appended claims in conjunction with the accompanying drawing, wherein:

Figure 1 is a somewhat diagrammatic side elevation of a combined harvesting and threshing machine showing automatic control mechanism illustrative of the invention applied thereto;

Figure 2 is a top plan view of a fragmentary portion of a pick-up attachment showing the connection thereto of the automatic control means;

Figure 3 is a diagrammatic illustration of the power-operated mechanism for lifting the cutting bar edge of the grain-receiving table of the combine; and Figure 4 is a side elevation of a combine without a pick-up mechanism and illustrates the application thereto of automatic control means illustrative of the invention.

In the arrangement shown in Figures 1 and 2, the combined harvesting and threshing machine is equipped with a pick-up attachment for picking up grain-bearing straw which has already been cut and laid in windrows and feeding such straw to the grain-threshing apparatus of the combine.

The combine is of the self-propelling type and is supported on a pair of front driving wheels 10 and a pair of rear steering wheels 11 and comprises a main or body portion 12 in which the threshing equipment is mounted and a power plant, not illustrated drivingly connected to the drive wheels 10 and to the threshing equipment for propelling the combine and operating the threshing equipment simultaneously. This engine also drives the cutter bar when the combine is being used for direct harvesting of standing grain and drives the pick-up attachment when the combine is being used to pick up windrow grain. A seat 13 is provided on the top of the body 12 near the forward end of the latter for an operator, and a steering wheel 14 mounted on the upper end of a steering column 15 is positioned adjacent the seat 13. A grain-receiving box 16 is positioned immediately behind the seat and suitable grain elevator means 17 leads from the threshing equipment to the top of the grain box. A straw-discharge chute 18 extends rearwardly from the body 10 of the combine and a grain-discharge chute 19 extends outwardly from the grain box near the bottom of the latter.

A grain-receiving table 20 is disposed at the front end of the body 12 and pivotally connected to the body at location 21 by suitable struts 22 disposed one at each end of the table. The front or leading edge of the table is equipped with conventional cutter bar mechanism, as indicated at 23 in Figure 4, and when the table structure is swung about the pivotal connection 21, this cutter bar is raised or lowered relative to the ground below the table. An arm 23 projects rearwardly from the strut 22 and has on its rearward end a rounded head 24 and a chain 25 is attached at one end to this head and passes under a guide roller 26 to a connection at its opposite end with the outer end of a piston rod 27 connected to a piston, not illustrated, reciprocable in a cylinder 28 fixed to the frame of the machine. A hydraulic pump 29 driven by the machine power plant is mounted in a pump housing 30 and conduits 31 and 32 lead from the outlet and inlet, respectively, of this pump to a rotatable, two-way valve 33 having one port connected to the pump outlet conduit 31, a second port connected to the pump inlet conduit 32, a third port connected through a conduit 34 to the interior of cylinder 28 at the forward end of the latter, and a fourth port connected through a conduit 35 to a sump tank or reservoir 36 interposed in the pump return line 32. The rotatable plug 37 of this valve, as diagrammatically illustrated, has a passage 38 which is operative to connect the pump outlet line 31 to the cylinder conduit 34 when the valve is in one operative position and to connect the cylinder conduit 34 to the pump return line 32 when the valve is in the alternative operative position. The valve plug is also provided with a by-pass passage 39 which connects the pump outlet line 31 to the conduit 35 leading to the sump 36 when the pump is in operative position to connect the cylinder conduit 34 to the pump inlet line so that a sufficient amount of hydraulic fluid will be by-passed around the pump to permit continuous operation of the pump without overheating or undue wear. A cylinder relief conduit 40 leads from the interior of the cylinder at the rear or opposite end thereof to the pump inlet, as by being connected into the sump 36, so that any hydraulic fluid leaking past the piston will not be trapped in the corresponding end of the cylinder, but will be returned to the fluid-circulating system. A suitable control shaft extends from the valve plug and carries an arm 42 outside of housing 30 and a link 43 connects the free end of arm 42 to the free end of an arm 44 mounted on the lower end of a shaft 45 rotatably supported on the steering wheel column 15. A handle 46 is provided on the upper end of shaft 45 for manual control of valve 33.

By this arrangement, when the handle 46 is moved to one operative position, the valve 33 is operated to connect the forward end of cylinder 28 with the outlet side of pump 29, whereupon the piston rod 27 is moved inwardly of the cylinder pulling upon the chain 25 and the chain pulls downwardly on the head 24 of arm 23 to swing the table 20 about pivotal connection 21 and raise the cutting bar edge of the table. When the handle 46 is moved to its opposite operating position, the valve 33 is operated to connect the cylinder conduit 34 to the sump 36, whereupon the weight of the table swings the entire table about the pivotal connection 21 to lower the cutting bar edge of the table toward the ground below the table.

The above-described construction is all conventional and constitutes no part of the present invention, except in the combination thereof with the novel automatic control hereinafter described. Also, while one particular form of combine has been diagrammatically illustrated and briefly described, it is to be understood that the automatic control of the invention is in no way limited to this particular form of combine, but may be applied to various types of combines having power-operated table-tilting mechanisms without in any way exceeding the scope of the invention.

In the arrangement illustrated in Figures 1 and 2, a conventional windrow pick-up attachment is pivotally connected to the cutting bar edge of the table 20 by a suitable hinge connection 47 and comprises a frame 48 pivotally connected to the leading edge of the table and in the forward end of which a pick-up drum or roller 49 is journaled. There are two similar frames 48 disposed one at each end of the pick-up attachment and each of these frames is supported at its outer end on a ground-engaging shoe 50, so that the frame swings up and down relative to the leading or cutting bar edge of the table in response to variations in the level of the ground below and immediately ahead of the table. The pick-up attachment includes other mechanism, such as the guard teeth 51 and a pair of spiral screw spreaders 52, but as this mechanism constitutes no direct part of the present invention, a complete illustration and description thereof is not considered necessary for the purposes of the present disclosure. Obviously an equivalent roller or rubber-tired wheel may be substituted for the shoe 50, if desired, without in any way exceeding the scope of the invention.

In accordance with the present invention, automatic control of the table-tilting or lifting mechanism is obtained by interposing a suitable connection between the ground-engaging shoes 50 of the pick-up attachment and the arm 44 of the manual control of the table-tilting mechanism. To this end, a standard 53 is rigidly secured at its lower end to the frame 48 at one end of the pick-up attachment and extends upwardly from the frame. An apertured lug 54 is secured to the upper end of this standard 53 and projects laterally therefrom and an elongated rod 55 is pivotally connected to the outer end of arm 44 and extends slidably through the lug 54. The rod may be attached to the arm 44 by the bolt 56 which connects the link 43 to the arm, the rod 55 being provided at its corresponding end with an eye receiving the bolt. A pair of compression springs 57 and 58 surround the rod 55, one at each side of the lug 54, and bear at their inner or adjacent ends against the lug. The outer ends of these compression springs bear against abutment sleeves or washers 59 and suitable nuts 60 threaded on the shaft are effective to adjust the loading on the compression springs to provide the desired resiliency in the connection between the shoe 50 and the arm 44 so that this arm can be moved by the handle 46 overriding the strength of the springs 57 and 58.

With this arrangement, when the shoes 50 encounter a rise in the ground, the upper end of the standard 53 will be moved toward the machine applying a compressive force to the rod 55 which will move the arm 44 and the link 43 in a direction to operate the valve 33 to connect the cylinder conduit 34 with the outlet line 31 of the hydraulic pump 29. When this occurs, the leading or cutter bar edge of the table will be quickly lifted and the table will pass safely over the rise in the ground without the cutter bar digging into the ground along the side or top of the rise. Similarly, when the shoes 50 descend into a depression in the ground, the upper end of standard 53 will be swung forwardly, away from the machine to operate the control of the table-tilting mechanism in a manner to lower the leading or cutter bar edge of the table so that the pick-up device will remain at the predetermined distance from the ground and no grain-bearing straw will be skipped by reason of the depression. The automatic control mechanism is fully effective on all sharp slopes of the ground and is particularly useful in crossing furrows and ditches to prevent the cutting bar edge of the table from picking up dirt and stones which would clog or break the threshing equipment of the combine.

When the machine is used for directly cutting the standing grain, the pick-up attachment is omitted and a cutter blade is mounted in the cutter bar and drivingly connected to the power plant of the machine. In this case, a pair of shoes or runners 61 having upwardly-curved forward ends are pivotally mounted one at each end of the table. Each of these runners has a standard 62 extending upwardly from a location intermediate the length of the runner and provided with a series of apertures for receiving a bolt 62' by means of which the runner is pivotally connected to a bracket 63 secured to the corresponding end of the table. This bracket has on its lower end a stop 64 which positively limits forward movement of the shoe relative to the table, the shoe being movable in a rearward direction upon encountering a sudden rise in the ground or other solid obstruction. The standard 62 is provided in its upper end with an eye 65 and a coil tension spring 66 is connected at one end to the eye 65 and at its opposite end to an eye bolt 67 which extends slidably through an aperture in a lug or bracket 68 secured to and projecting outwardly from the corresponding side of the table 20. Nuts 69 are threaded onto the eye bolt to adjust the tension on spring 66.

A shaft 70 extends transversely of the table 20 to the rear of reel 71 and is journaled on the sides of the table. Respective arms 72 are secured, each at one end, to shaft 70 near the opposite ends of the shaft and depend therefrom. Respective links or strands 73 connect the upper ends of the shoe standards 62 to the lower ends of depending arms 72 so that shaft 70 is partially rotated each time one or both of the shoes 61 are forced rearwardly by encountering a rise in the ground or a solid obstruction. The shoes slide along the ground and will by-pass such objects as loose stones so that the control valve will not be subjected to constant minor movements.

An arm 74 is connected at one end to shaft 70 intermediate the length of the latter and extends upwardly therefrom. The apertured lug 54 is secured to this upstanding arm near the upper end of the latter and slidably receives the rod 55 pivotally connected at one end to control arm 44. The springs 57 and 58 surround rod 55 one at each side of lug 54 and adjusting nuts 60 are threaded onto the rod at the outer ends of the springs to control the loading on the springs.

With this arrangement, whenever the shoes 61 are forced rearwardly relative to table 20 against the force of springs 66, the control valve will be operated to raise the cutter bar edge of the table and when the drag on the shoes is released, the cutter bar edge of the table will be lowered. The mechanism will thus operate to automatically maintain the cutter bar edge of the grain-receiving table a predetermined safe distance above the ground.

In both of the examples above described, a ground-engaging means is provided extending somewhat ahead of the cutter bar edge of the table and pivotally connected to the table for automatically operating the table-lifting mechanism in response to variations in the ground level below and immediately ahead of the table to cause the table-lifting, power-operated mechanism to lift the table over any obstructions encountered and lower the table when a ground depression is encountered.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a combined harvesting and threshing machine having a tiltable grain-receiving table, power-operated mechanism for tilting said table to raise and lower the cutting bar edge of the table relative to the ground, and manually-operated control means for said mechanism, automatic control means comprising an arm pivotally supported on said table and movable in response to changes in the level of the ground at the cutting bar edge of said table, and means connecting said arm to said manually-operated control means to control said power-operated mechanism to raise and lower the cutting bar edge of said table in response to changes in the level of the ground over which said table passes, said means connecting said arm to said manually-operated control means comprising an apertured lug on said arm, a rod connected at one end to said control means and slidably received in the aperture of said lug, a pair of compression springs surrounding said rod one at each side of said lug, and abutment means carried by said rod at the outer ends of said springs and movable relative to said rod to adjust the loading of said springs.

2. In a combined harvesting and threshing machine including a tiltable, grain-receiving table, power-operated mechanism for tilting said table to raise and lower the cutter bar edge of the latter relative to the level of the ground below said table, and manually-operated control means for said power-operated means, automatic control means for the tilting of said table comprising ground-engaging means pivotally connected to said table near the cutter bar edge of the latter, and means including a flexible joint connecting said ground-engaging means to said manually-operated control means, said connecting means comprising a shaft extending transversely above said table and journaled on the latter, arms depending one from each end of said shaft, an arm projecting upwardly from said shaft intermediate the length of the latter, a rod extending from said manually-operated control means past said upwardly-projecting arm, a resilient connection between said rod and said upwardly-projecting arm, and respective links connecting said depending arms to said ground-engaging means.

3. In a combined harvesting and threshing machine including a tiltable, grain-receiving table, power-operated mechanism for tilting said table to raise and lower the cutter bar edge of the latter relative to the level of the ground below said table, and manually-operated control means for said power-operated means, automatic control means for the tilting of said table comprising ground-engaging means pivotally connected to said table near the cutter bar edge of the latter, and means including a flexible joint connecting said ground-engaging means to said manually-operated control means, said ground-engaging means comprising shoes pivotally connected one to each end of said table at the cutter bar edge of the latter, each of said shoes including a runner having an upwardly-curved forward end portion and an upstanding standard intermediate the ends of said runner, and respective brackets pivotally connecting said standards to said table for vertical adjustment relative to the table.

4. In a combined harvesting and threshing machine including a tiltable, grain-receiving table, power-operated mechanism for tilting said table to raise and lower the cutter bar edge of the latter relative to the level of the ground below said table, and manually-operated control means for said power-operated means, automatic control means for tilting of said table comprising ground-engaging means pivotally connected to said table near the cutter bar edge of the latter, and means including a flexible joint connecting said ground-engaging means to said manually-operated control means, said ground-engaging means comprising shoes pivotally connected one to each end of said table at the cutter bar edge of the latter, each of said shoes including a runner having an upwardly curved forward end portion and an upstanding standard intermediate the ends of said runner, and respective brackets pivotally connecting said standards to said table for vertical adjustment relative to the table, and said connecting means comprising a shaft extending transversely above said table and journaled on the latter, arms depending one from each end of said shaft, an arm projecting upwardly from said shaft intermediate the length of the latter, a rod extending from said manually-operated control means past said upwardly-projecting arm, a resilient connection between said rod and said upwardly-projecting arm, and respective links connecting said depending arms to the upper ends of said shoe standards.

GUST J. HERIGSTAD.

REFERENCES CITED

The following references are of record in the file of this patent:

UNITED STATES PATENTS

| Number | Name | Date |
| --- | --- | --- |
| 2,410,918 | Acton | Nov. 12, 1946 |
| 2,411,623 | Jaques | Nov. 26, 1946 |
| 2,420,219 | Baldwin | May 6, 1947 |
| 2,473,655 | Lohn | June 21, 1949 |